United States Patent

[11] 3,630,594

[72] Inventor Istvan Gorog
Princeton, N.J.
[21] Appl. No. 40,111
[22] Filed May 25, 1970
[45] Patented Dec. 28, 1971
[73] Assignee RCA Corporation

[54] HOLOGRAPHIC SCAN CONVERTER
6 Claims, 4 Drawing Figs.

[52] U.S. Cl. .................................................. 350/3.5, 350/7
[51] Int. Cl. .................................................. G02b 27/00
[50] Field of Search .................................... 350/3.5, 6, 7

[56] References Cited
UNITED STATES PATENTS
3,530,442  9/1970  Collier et al. .................. 350/3.5
OTHER REFERENCES
Cindrich, Applied Optics, Vol. 6, No. 9, Sept. 1967, pp. 1531–1534

*Primary Examiner*—David Schonberg
*Assistant Examiner*—Ronald J. Stern
*Attorney*—Edward J. Norton ABSTRACT: A first predetermined scan configuration, such as a circular scan for instance, of wave energy is converted into a different second predetermined scan configuration, such as a straight line for instance, of wave energy by means of a plurality of separate holograms.

3,630,594

HOLOGRAPHIC SCAN CONVERTER

The present invention relates to scan conversion, and, more particularly, to a holographic technique for scan conversion.

There are certain scan configurations for wave energy, such as light from a laser source for instance, which are more easily achieved than other scan configurations. By way of example, a mirror illuminated with a fixed laser light beam may be easily deflected into a scan pattern in the form of the perimeter of a circle by tilting the mirror in a circular manner by means of two orthogonal drivers, driven by signals of the same predetermined frequency which are 90° at a phase with respect to each other but which are of equal amplitude. Such a circular deflection is somewhat more easily achieved than a linear deflection of the laser light beam. It is much more easily achieved than some complicated scan configuration, such as a pattern in the shape of a number or letter, for instance.

The present invention is directed to a holographic scan converter for converting a first predetermined scan configuration into a different second predetermined scan configuration. This makes it possible to easily convert a first scan configuration which is directly derived relatively simply into a more complex scan configuration which would be more difficult or even impossible to derive directly.

Briefly, in accordance with the principles of the holographic scan converter of the present invention, a first predetermined scan configuration is divided into a series of a predetermined number of ordinally arranged contiguous incremental areas. A separate hologram is positioned at each respective ordinal incremental area of the first scan configuration. Further, the second scan configuration is divided into a series of ordinally arranged incremental areas equal in number to the aforesaid said predetermined number, with each respective ordinal incremental area of the second scan configuration corresponding with that respective ordinal one of the first scan configuration. Each of the holograms comprises an interference pattern responsive to the illumination of that ordinal hologram with wave energy having the first scan configuration for reconstructing a beam of wave energy which illuminates the corresponding ordinal area of the second scan configuration.

It is therefore an object of the present invention to provide an improved scan converter.

This and other objects, features and advantages of the present invention will become more apparent from the following detailed description, taken together with the accompanying drawing, in which.

Since a circular scan pattern is very simply generated directly, it has been utilized to illustrate the first predetermined scan configuration which is converted into some other different second predetermined scan configuration. However, it should be understood that the choice of a circular scan pattern for illustrative purposes is not intended to be limiting, and that way other scan configuration can be used as the first predetermined scan configuration.

Figure 1:
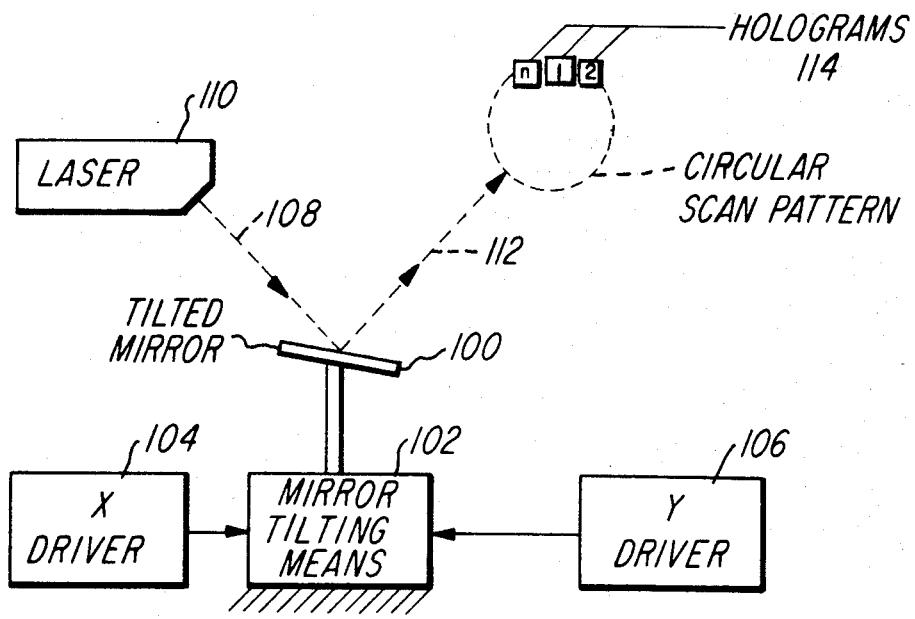
FIG. 1 is an illustrative embodiment of apparatus employing a holographic technique for converting a circular scan pattern into a different other scan pattern.

Referring now to FIG. 1, mirror 100 is tiltably mounted on mirror tilting means 102, which controls the position of mirror 100 in accordance with respective drive signals applied thereto from X driver 104 and Y driver 106. The X drive signal from driver 104 is a sinusoidal voltage of given amplitude, frequency and phase. The drive signal from Y driver 106 is a sinusoidal voltage of the same given amplitude and frequency as the drive signal from X driver 104, but which is in phase quadrature therewith. Furthermore, the X and Y drive signals, respectively, from drivers 104 and 106 are applied to the motive means (not shown) of mirror tilting means 102 to provide respective piezoelectric or magnetic forces in response thereto, which respective forces are spatially displaced from each other by an angle of 90°. The result of all this is to cause tilted mirror 100 to be rotated or wobbled through 360° by mirror tilting means 102 during each cycle of the drive signals from drivers 104 and 106, as is well known in the art.

Tilted mirror 100 is illuminated by a fixed beam 108 (only the centerline of which is shown) from laser 110. Incident beam 108 is inclined at a fixed angle with respect to the axis of rotation of tilted mirror 100, but the angle of incidence between beam 108 and the normal to tilted mirror 100 varies in accordance with the instantaneous position of tilted mirror 100. This results in reflected beam 112 being deflected in a conical scan, with each scan cycle being equal to a period of the sinusoidal signal supplied to drivers 104 and 106.

Lying in a plane substantially perpendicular to the axis of the conical scan and positioned on the perimeter of a circle defined by scanning reflected beam 112 are arranged in serial order a predetermined plurality of n holograms 114, as shown in FIG. 1. Holograms 114, as shown, are numbered 1, 2 ... n. Thus, during each scan cycle each of holograms 114 will be illuminated in order by reflected beam 112 during each scan cycle thereof.

Each of holograms 114 comprises a recording of an interference pattern resulting from two angularly separated beams of coherent wave energy, such as light. The orientation of a first of these two beams of any one of holograms 114 with respect to the area of that hologram corresponds in all respects to the orientation of reflected beam 112 with respect to the area of that hologram.

The orientation of the second beam employed in recording each of holograms 114 with respect to the area of that hologram is preselected in accordance with the desired converted scan in a manner to be described in more detail below.

The point to be made at this time is that, as known in the art, the illumination of any hologram by reflected beam 112, which corresponds in all respects to the orientation of the first beam employed in recording the hologram, results in the reconstruction of an output beam which corresponds in all respects to the orientation with respect to the area of that hologram of the second beam employed in recording that hologram.

Figure 2:
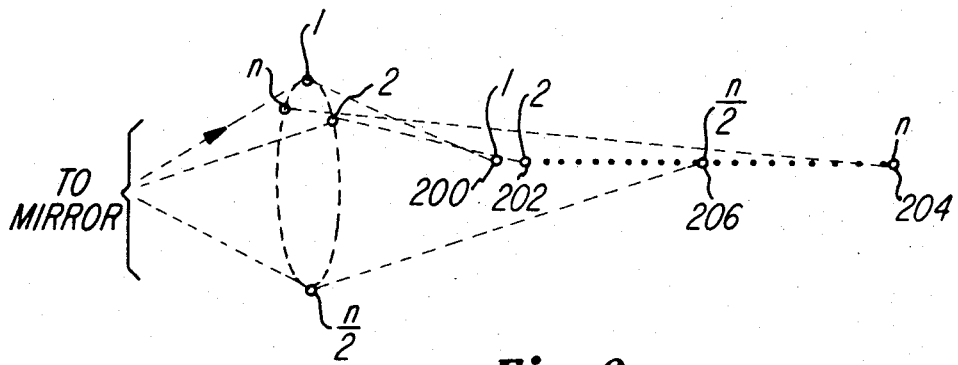
FIG. 2 shows a first species of FIG. 1, where the other scan pattern is a straight line.
Figure 3:
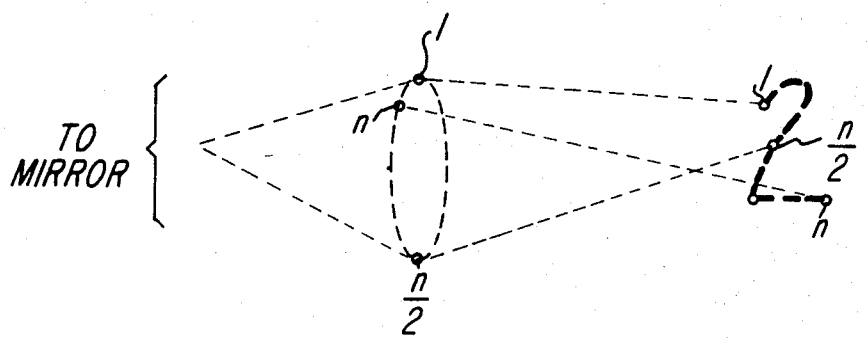
FIG. 3 shows a second species of FIG. 1 where the other scan pattern is in the form of the character "2," and, FIG. 4 shows apparatus for recording each of the respective holograms employed in FIG. 1.

Referring now to FIGS. 2 and 3, there are shown two different examples of converted scans which may be derived with the apparatus of FIG. 1. The difference in the converted scan depends solely upon the selection of the orientation of the second beam employed in the recording of the set of holograms 114.

In particular, referring to FIG. 2, assume that it is desired to convert the circular scan pattern of reflected beam 112 in FIG. 1 into a linear scan. In this case, the respective orientations of the second beam employed in recording each separate one of the set of holograms 114 is chosen in such a manner that when hologram 1 is illuminated by beam 112, hologram 1 produces an output beam passing through the area 200. Similarly, when hologram 2 of the set of holograms 114 is illuminated by reflected beam 112, this hologram produces an output beam passing through area 202. Area 200, corresponding to hologram 1, and area 202, corresponding to hologram 2 of the set of holograms 114 define a given straight line connecting these two areas. If the respective second beams of the rest of the holograms 114, such as hologram n/2 and n, are appropriately chosen, the illumination of each successive one of the set of holograms 114 by circular scan reflected beam 112 will result in an output beam being produced by that hologram which passes through the next successive point in serial order of the extension of the line defined by areas 200 and 202, in the manner illustrated in FIG. 2. Thus, a linear scan of the line extending from area 200 to area 204, corresponding to hologram n of the set of holograms 114, and including areas corresponding to all the intermediate ones of the set of holograms 114, such as area 206 corresponding to hologram n/2 will be derived during each scan cycle of reflected beam 112. Thus, a circular scan pattern is converted into a linear scan pattern.

As shown in FIG. 3, the converted scan which is derived by the present invention may be more complex than the straight line scan shown in FIG. 2. In particular, the circular scan pattern of reflected beam 112 of FIG. 1 may be converted into a character, for instance, such as the numeral "2," as shown in FIG. 3, by properly choosing the orientation of the respective second beams employed in recording each of the set of holograms 114 of FIG. 1.

In general, the holographic scan converter of the present invention is capable of converting a first predetermined scan configuration into any different second predetermined scan configuration, so long as the following constraints are met. First, the first scan configuration is made up of a series of a predetermined number of ordinally arranged contiguous incremental areas. Second, a separate hologram of a set of holograms is positioned at each respective ordinal incremental area of the first scan configuration. Third, the scan configuration to be derived consists of a series of ordinally arranged incremental areas equal in number to the predetermined number with each respective ordinal incremental area of the derived configuration corresponding with that respective ordinal one of the first scan configuration. Fourth, each of the holograms comprises an interference pattern responsive to the illumination of that ordinal hologram with wave energy having the first scan configuration for reconstructing a beam of wave energy which illuminates the corresponding ordinal area of the derived scan configuration.

Figure 4:
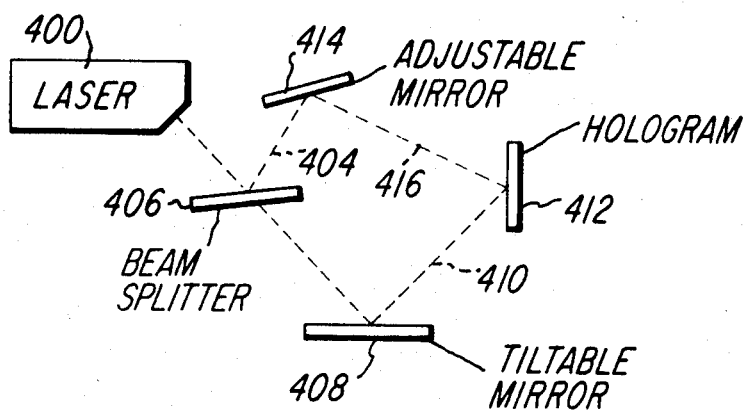

FIG. 4, shows apparatus for recording a hologram to be employed as any one of the set of holograms 114 in FIG. 1. Laser 400 produces an output which is divided into two beams 402 and 404 by beam splitter 406. Beam 402 is reflected from tiltable mirror 408 to produce reflected beam 410, which is incident on the recording surface of hologram 412. The tilt of tiltable mirror 408 is such that the orientation of beam 410 with respect to hologram 412 is substantially identical to the orientation of beam 112 in FIG. 1 with the particular ordinal one of the set of holograms 114 which will be filled by hologram 412. Beam 404 is reflected from adjustable mirror 414 to produce reflected beam 416 which is also incident on the surface of hologram 412, and which cooperates with beam 410 to record an interference pattern. Adjustable mirror 414 is adjusted to provide an orientation with respect to hologram 412 which substantially corresponds with the orientation of the desired output beam to be derived by the ordinal one of holograms 114 of FIG. 1 for which recorded hologram 412 will be employed. Thus, it can be seen that by properly adjusting mirrors 408 and 414 for each one of a set of holograms to be prepared for use in the present invention, it is possible to convert any first predetermined scan configuration into a different second predetermined scan configuration.

What is claimed is:

1. A holographic scan converter for converting any predetermined arbitrary first continuous-scan configuration of wave energy illuminating a given fixed area into a different predetermined arbitrary second continuous-scan configuration of said wave energy illuminating a preselected fixed area located in predetermined stationary spaced relationship with respect to said given area, wherein the shape of said second continuous-scan configuration is unrelated to the shape of said first continuous-scan configuration, and wherein each of said given fixed area and said preselected fixed area can be considered to be the sum of the same given number of ordinally arranged, serially disposed, contiguous, incremental fixed subareas; said scan converter comprising a separate, individual fixed hologram occupying each respective ordinal subarea of said given area, whereby said holograms are stationary with respect to said preselected area, each hologram consisting of an interference pattern responsive to the illumination thereof with said wave energy having said first continuous-scan configuration for reconstructing a beam of said wave energy which illuminates that one of the subareas of said preselected area which ordinally corresponds with the ordinal subarea of said given area occupied by that hologram, and means for sequentially illuminating said individual holograms in said order with said first continuous-scan configuration of wave energy.

2. The hologram converter defined in claim 1, wherein said given area lies in a first plane and said preselected area lies in a second plane oriented substantially perpendicular to said first plane.

3. The converter defined in claim 2, wherein said first predetermined scan configuration is in the form of the perimeter of a circle.

4. The converter defined in claim 3, wherein said second predetermined scan configuration is in the form of a straight line.

5. The converter defined in claim 3, wherein said converter includes a laser for generating light wave energy, a mirror illuminated by said light wave energy from said laser, signal-controlled means coupled to said mirror for deflecting said mirror to provide said circular first predetermined scan configuration, and said series of holograms lying on the perimeter of a circle illuminated by said light wave energy which is reflected from said mirror.

6. A holographic scan-converting method for converting any predetermined arbitrary first continuous-scan configuration of wave energy illuminating a given fixed area into a different predetermined arbitrary second continuous-scan configuration of said wave energy illuminating a preselected fixed area located in predetermined stationary spaced relationship with respect to said given area, wherein the shape of said second continuous-scan configuration is unrelated to the shape of said first scan configuration, and wherein each of said given fixed area and said preselected fixed area can be considered to be the sum of the same given number of ordinally arranged, serially disposed, contiguous, incremental fixed subareas; said scan-converting method comprising the steps of recording separate, individual fixed holograms occupying each respective ordinal respective ordinal subarea of said given area, whereby said holograms are stationary with respect to said preselected area, each hologram consisting of an interference pattern responsive to the illumination thereof with said wave energy having said first continuous-scan configuration for reconstructing a beam of said wave energy which illuminates that one of the subareas of said preselected area which ordinally corresponds with the ordinal subarea of said given area occupied by that hologram, and sequentially illuminating said individual holograms with said first continuous-scan configuration of wave energy.

* * * * *